UNITED STATES PATENT OFFICE.

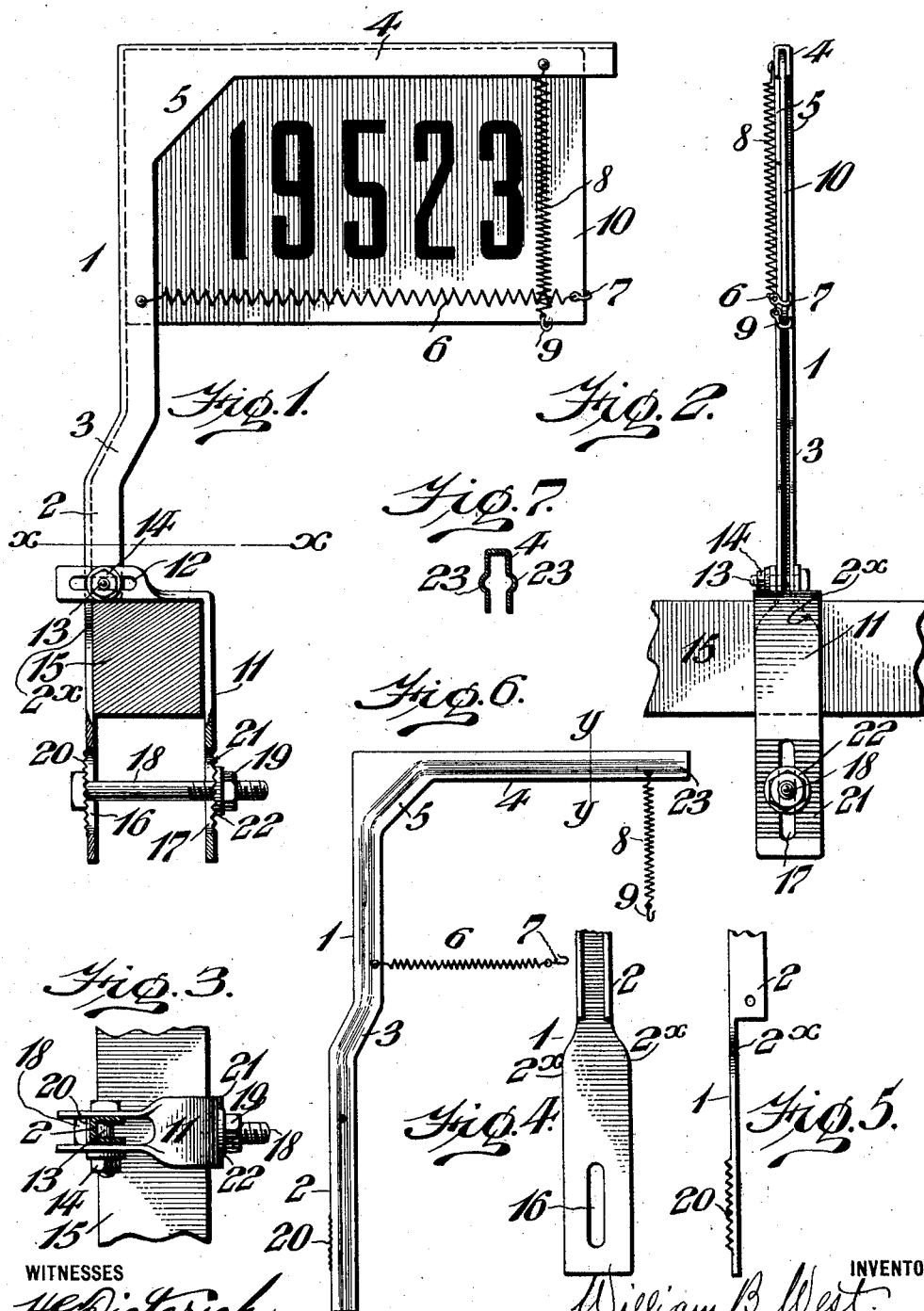

WILLIAM B. WEST, OF PHILADELPHIA, PENNSYLVANIA.

AUTOMOBILE TAG-HOLDER.

1,016,723. Specification of Letters Patent. Patented Feb. 6, 1912.

Application filed April 5, 1911. Serial No. 619,066.

*To all whom it may concern:*

Be it known that I, WILLIAM B. WEST, a citizen of the United States, residing in the city and county of Philadelphia, State of Pennsylvania, have invented a new and useful Automobile Tag-Holder, of which the following is a specification.

My invention relates to a new and useful support or holder for an automobile or other vehicle license tag or number plate, and consists of means whereby the tag may be quickly and easily inserted and removed and will be held firmly in proper position.

It further consists in providing means whereby the holder may be connected with and removed from the automobile or vehicle.

It further consists of other novel features of construction, all as will be hereinafter fully set forth.

Figure 1 represents a side elevation, with a portion broken away, of a support or holder for an automobile or other vehicle license tag or number plate showing a license tag or plate in position. Fig. 2 represents an end elevation thereof. Fig. 3 represents a sectional view on line $x$—$x$, Fig. 1. Figs. 4 and 5 represent an end elevation and a side elevation respectively of the lower portion of the standard. Fig. 6 represents a side elevation, on a smaller scale, of the frame provided with a stiffening rib. Fig. 7 represents a sectional view on line $y$—$y$, Fig. 6.

Similar numerals of reference indicate corresponding parts in the figures.

Referring to the drawings: In the supports or holders for license tag or number plates for automobiles and other vehicles now in use, it is difficult to insert and remove the tags from the support and to provide means whereby the holder is adapted for license tags or plates of different sizes. My invention is designed to overcome these defects, and in the drawings I have shown a form which will operate successfully in practice, but it will be evident that the arrangements of the parts may be varied, other instrumentalities may be employed and changes may be made in the construction, which will come within the scope of my invention, and I do not therefore desire to be limited in every instance to the exact form herein shown and described but desire to make such changes as may be necessary within the scope of the appended claim.

1 designates the support for the license tag or number plate which consists of a frame formed of a channeled standard 2, which is preferably provided with an offset 3 at a suitable point, and has the channeled arm member 4, projecting at an angle from adjacent the upper portion of said standard, a suitable plate or corner piece 5 serving to stiffen the parts and provide a recess of considerable extent for the reception of one corner of the tag. It will be understood that the channel 2 may be of any suitable width and depth in order that the side edges or flanges form a channel of suitable extent to embrace the said tag.

6 designates a resilient member, shown, in the present instance, as a spring which is suitably connected at one end to the standard 2 and at its opposite or free end is provided with a hook 7 or other suitable means for engagement with an edge of the tag 10.

8 designates a second resilient means, here shown as a spring, one end of which is connected with the offset member 4 and the opposite or free end of which is provided with a hook 9 or other suitable means for engagement with the edge of the tag.

10 designates the license tag or number plate provided with the suitable notations and which is adapted, as previously stated, to have a portion thereof seated in the channels of the standard 2 and the offset member 4, after which one of the springs, say the spring 6 is properly extended in order to cause the hook 7 to engage with the upright edge of the tag 6, holding the latter longitudinally with respect to the support, while the other spring is extended to permit the hook 9 to engage with the lower end of the tag 10, holding the same from lateral movement, whereby it will be seen and noted that the two hooks engaging with the proper edges of the tag tend to force the same against the upright 2 and the offset member 4, in order that the tag will be firmly and positively held in position.

It will be noted that by this means the tag 10 can be quickly inserted and removed from the support and that the hooks 7 and 9 are properly positioned to engage with a suitable portion of the outer edges in order to accomplish this result. In this way no adjustment of any parts is required in order to accommodate tags or plates of different sizes. It will be understood that the standard or support are channeled for a suitable portion of their extent and that the offset 3 may be employed or not.

I preferably desire to connect the support with the frame of the automobile and for this purpose I have shown an angular or bent member 11 which may be channeled or not as desired and which is provided in one of its arms with a slot 12, in which is seated a bolt 13, having a suitable head at one end and the opposite end of which is adapted to be engaged by a nut 14 whereby it will be seen that the bent member 11 can be adjusted with respect to the standard 2, since the bolt 13 is seated in or passes through suitable openings in the said standard. The downwardly projecting portion or arm of the member 13 is capable of being suitably adjusted with respect to the standard 2 in order to provide sufficient space therebetween to receive a suitable portion of the frame 15 of the automobile or other vehicle.

At a suitable point in standard 2, as shown in Fig. 1, I preferably discontinue the side flanges, flattening out the same as at 2ˣ, and I provide a vertically extending slot 16 therein and at a corresponding point in the bent member 11 I provide a similar vertically extending slot 17, these slots being adapted to receive a bolt 18 which passes therethrough, and on one end of which is provided with a nut 19 in order that after the portion of the frame 15 is seated between the standard 2 and the downwardly extending portion of the bent member 11, the nut 19 can be tightened on the bolt 18 firmly gripping a portion of the frame 15 therebetween in order to lock the support rigidly in position.

I preferably desire to serrate the standard 2 at 20, adjacent the slot 16, to engage the inner face of the head on the bolt 18 and to serrate the downwardly projecting portions 4 adjacent to slot 17, which serrations are adapted to be engaged by a serrated face on a washer 22 in order to prevent slipping of the parts.

In the construction shown in Fig. 4 I have shown a support similar to that already described, excepting that I provide the flanges of the channeled portion with a rib or bead 23 which preferably extends in the standard or offset member 4, in order to strengthen the same and provide sufficient rigidity to the support.

Having thus described my invention, what I claim as new and desire to secure by Letters Patent, is:—

A support for automobile number plates comprising a channeled standard, an arm of channel section carried thereby, a plurality of resilient means one of which is connected with the standard and the other with the arm and both adapted to engage a number plate and hold said plate in said channel members, and means to secure said support to an automobile frame.

WILLIAM B. WEST.

Witnesses:
E. W. MOWREY,
CHAS. L. GUSS.

---

Copies of this patent may be obtained for five cents each, by addressing the "Commissioner of Patents Washington, D. C."